United States Patent
Whitbread et al.

(10) Patent No.: US 11,556,042 B2
(45) Date of Patent: Jan. 17, 2023

(54) RF CHIRP REDUCTION IN MZ MODULATOR

(71) Applicant: Lumentum Technology UK Limited, Towcester Northamptonshire (GB)

(72) Inventors: Neil David Whitbread, Northamptonshire (GB); Stephen Jones, Northamptonshire (GB)

(73) Assignee: Lumentum Technology UK Limited, Northamptonshire (GB)

( * ) Notice: Subject to any disclaimer, the term of this patent is extended or adjusted under 35 U.S.C. 154(b) by 388 days.

(21) Appl. No.: 16/604,917

(22) PCT Filed: Sep. 24, 2018

(86) PCT No.: PCT/GB2018/052706
§ 371 (c)(1),
(2) Date: Oct. 11, 2019

(87) PCT Pub. No.: WO2019/063981
PCT Pub. Date: Apr. 4, 2019

(65) Prior Publication Data
US 2022/0299835 A1    Sep. 22, 2022

(30) Foreign Application Priority Data
Sep. 29, 2017 (GB) .................................. 1715892

(51) Int. Cl.
*G02F 1/225* (2006.01)
(52) U.S. Cl.
CPC .......... *G02F 1/2257* (2013.01); *G02F 1/2255* (2013.01); *G02F 2201/126* (2013.01); *G02F 2203/25* (2013.01)

(58) Field of Classification Search
CPC ................ G02F 1/2257; G02F 1/2255; G02F 2201/126; G02F 2203/25
(Continued)

(56) References Cited

U.S. PATENT DOCUMENTS 8,374,469 B2    2/2013 Yamada
8,818,141 B1    8/2014 Hochberg et al.
(Continued)

FOREIGN PATENT DOCUMENTS

CN    101384931 A    3/2009
CN    107045214 A    8/2017
(Continued)

OTHER PUBLICATIONS

PCT International Search Report and Written Opinion corresponding to PCT/GB2018/052706, dated Dec. 12, 2018, 10 pages.

*Primary Examiner* — Robert Tavlykaev
(74) *Attorney, Agent, or Firm* — Harrity & Harrity, LLP

(57) ABSTRACT

A waveguide structure for use in a balanced push-pull Mach Zehnder modulator. The waveguide structure comprises a plurality of layers. The layers comprise, in order: an insulating or semi-insulating substrate; an lower cladding layer; an waveguide core layer; and an upper cladding layer. The lower cladding layer, waveguide core layer, and upper cladding layer are etched to form: a signal waveguide and a ground waveguide, which are connected via the lower cladding layer; and a signal line and a ground line, each located adjacent to the respective waveguide, and each connected to the respective waveguide via one or more respective resistive structures connected in the plane of the lower cladding layer.

20 Claims, 4 Drawing Sheets

(58) Field of Classification Search
USPC .......................................................... 385/1–3
See application file for complete search history.

(56) References Cited

U.S. PATENT DOCUMENTS

| | | | |
|---|---|---|---|
| 9,915,849 B2 | 3/2018 | Nishikawa et al. | |
| 10,295,738 B2* | 5/2019 | Bach | G02F 1/2257 |
| 2005/0123242 A1 | 6/2005 | Walker et al. | |
| 2005/0147351 A1* | 7/2005 | Johnstone | G02F 1/3133 |
| | | | 385/40 |
| 2011/0243491 A1 | 10/2011 | Hashimoto | |
| 2015/0043865 A1* | 2/2015 | Velthaus | G02F 1/25 |
| | | | 385/3 |

FOREIGN PATENT DOCUMENTS

| | | | |
|---|---|---|---|
| WO | 0177741 | A2 | 10/2001 |
| WO | 2016097406 | A1 | 6/2016 |

* cited by examiner

RF CHIRP REDUCTION IN MZ MODULATOR

CROSS-REFERENCE TO RELATED APPLICATIONS

This application is a 371 national stage application of PCT Application No. PCT/GB2018/052706, filed on Sep. 24, 2018, which claims priority to United Kingdom Patent Application No. 1715892.4, filed on Sep. 29, 2017, which are incorporated by reference herein.

FIELD OF THE INVENTION

The present invention relates to Mach-Zehnder interferometers. In particular, the invention relates to a waveguide structure for a Mach-Zehnder interferometer having reduced chirp at low frequencies, and a method of manufacturing the same.

BACKGROUND

A Mach-Zehnder modulator, as shown schematically in FIG. 1, functions by using a beamsplitter 101 to split an input beam 102 along two optical paths 103,104, and then recombining the beams from each optical path at an optical combiner 105 to form an output beam 107 (and a complementary output 106). Each optical path 103, 104 comprises an electro-optic material, such that a change in the phase of the beam travelling along the optical path can be induced by providing a voltage across the electro-optic material.

Where the Mach-Zehnder modulator is used for intensity modulation, a pure intensity modulation can be obtained by providing equal and opposite phase shifts (i.e. voltages) to each of the optical paths 103, 104. Any difference between the magnitude of the phase shift on each optical path 103, 104 will result in an undesired phase modulation of the output—known as "chirp". This mode of operation is known as "push-pull" operation.

Push-pull operation may be implemented in a variety of ways. One example, known as a "series" or "single drive" push-pull modulator is shown in FIG. 2, which is a cross section of a Mach-Zehnder interferometer along the line A-A in FIG. 1. The interferometer comprises a substrate 201 made from a semiconductor such as InP or GaAs. The substrate is insulating or "semi-insulating", i.e. doped to provide high resistivity such that it effectively acts as an insulator (e.g. with a resisitivity greater than $10^5$ Ohm cm). On top of the substrate are several layers, comprising in order an lower cladding layer 202, a waveguide core layer 203, and an upper cladding layer 204. The upper and lower cladding layers are doped semiconductors, e.g. the upper cladding layer may be p doped and the lower cladding layer may be n doped, or vice versa.

Each layer 202-204 may have a composite structure, depending on the waveguide properties desired. These layers are etched to form four parallel structures (presented in order): a signal line 211, a signal waveguide 212, a ground waveguide 213, and a ground line 214. The gap between each line 211, 214 and the respective waveguide 212, 213 is etched down to the substrate 201. The gap between the waveguides is etched down to the lower cladding layer 202, i.e. the waveguides 212, 213 are connected via the lower cladding layer 202.

Each waveguide 212, 213 comprises a dielectric cladding 221 to either side of the waveguide to protect the sidewall. The signal waveguide 212 comprises a signal waveguide electrode 222, and the ground waveguide 213 comprises a ground waveguide electrode 223. Each waveguide electrode is made from metal and located on top of the upper cladding layer 204. The waveguide core layer 203 forms the core 224 of each waveguide 212, 213.

Each line 211, 214 comprises a dielectric layer 231 on top of the upper cladding layer 204 (this is not strictly required—however it is advantageous to reduce the capacitance of the line and eliminate parasitic circuit paths). The signal line 211 comprises a signal line electrode 232, and the ground line 214 comprises a ground line electrode 233. Each line electrode is made from metal and located on top of the dielectric layer 231.

The signal line electrode 232 and ground line electrode 233 together form a transmission line which carries an AC modulation signal. The ground line electrode 233 is connected to ground, and the signal line electrode 232 is connected to an AC voltage source 241. Each line electrode 232, 233 is connected to the respective waveguide electrode 222, 223 by conductive airbridges 242, 243 located at intervals along the length of the modulator. The central portion of the lower cladding layer 202 connecting the waveguides 212, 213 is connected to a DC voltage source 244 to provide a bias voltage.

When an AC signal voltage V is provided to the signal line electrode 232 (and thereby to the signal waveguide electrode 222 due to the airbridges 242), this voltage is split to provide a voltage V/2 across each waveguide 212, 213, in opposite directions. The signal line 212 and ground line 213 each act as capacitors, which form a potential divider (with a midpoint at the central portion of the lower cladding layer 202 which connects the waveguides 212, 213) when subject to an AC load.

However, it has been found that at low frequencies (below about 1 GHz), the voltage division is not even and excessive "chirp" (i.e. undesired phase modulation of the output) is experienced at the output of the modulator.

SUMMARY

According to a first aspect of the invention, there is provided a waveguide structure for use in a balanced push-pull Mach Zehnder modulator. The waveguide structure comprises a plurality of layers. The layers comprise, in order:
 an insulating or semi-insulating substrate;
 an lower cladding layer;
 an waveguide core layer; and
 an upper cladding layer.
The lower cladding layer, waveguide core layer, and upper cladding layer are etched to form:
 a signal waveguide and a ground waveguide, which are connected via the lower cladding layer; and
 a signal line and a ground line, each located adjacent to the respective waveguide, and each connected to the respective waveguide via one or more respective resistive structures connected in the plane of the lower cladding layer.

According to a second aspect, there is provided a balanced push-pull Mach-Zehnder interferometer comprising a waveguide structure according to the first aspect.

According to a third aspect, there is provided a method of manufacturing a waveguide structure for a Mach-Zehnder interferometer. A layered structure is provided, the layered structure comprising:
 an insulating or semi-insulating substrate;
 an lower cladding layer;

an waveguide core layer; and
a upper cladding layer.

The lower cladding layer, waveguide core layer, and upper cladding layer are etched to form:
- a signal waveguide and a ground waveguide, which are connected via the lower cladding layer; and
- a signal line and a ground line, each located adjacent to the respective waveguide, and each connected to the respective waveguide via one or more respective resistive structures in the plane of the lower cladding layer.

Further embodiments are defined in claim 2 et seq.

DETAILED DESCRIPTION

Figure 1:
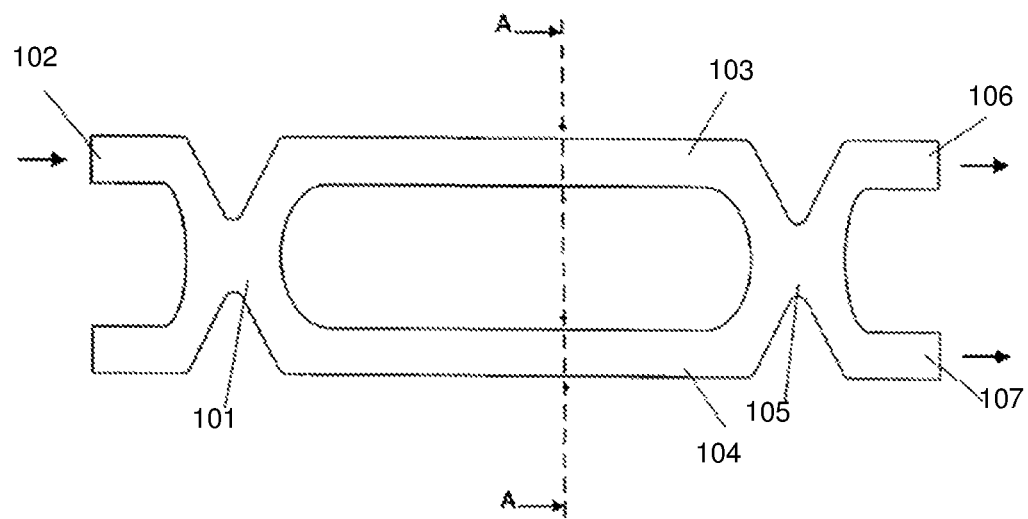
FIG. 1 is a schematic illustration of a Mach-Zehnder interferometer.
Figure 2:
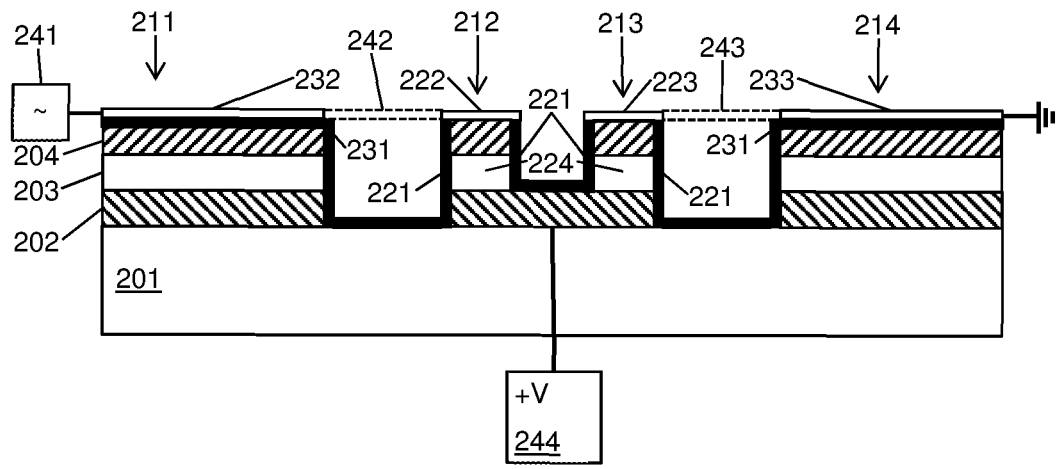
FIG. 2 is a cross section of the interferometer of FIG. 1.
Figure 3:
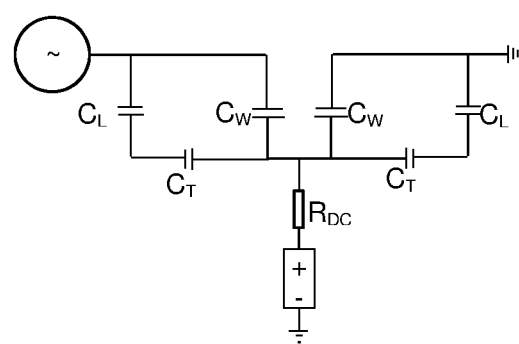
FIG. 3 is a circuit diagram of the equivalent circuit for an the interferometer of FIG. 1.

At low frequencies, a series push-pull modulator will experience unacceptable levels of chirp due to the voltage imbalance between the two waveguides. The reason for this can be seen by considering the full equivalent circuit for the modulator of FIG. 1, as shown in FIG. 3. Each of the waveguides 212, 213 has an associated capacitance $C_W$, which has a reactance $1/(2\pi f C_W)$ (where f is the frequency of the AC signal). There is also a capacitance $C_L$ over each of the lines 211, 214 and a capacitance $C_T$ between each line and the respective waveguide—but since $C_T$ is much smaller than $C_W$, these capacitances have negligible effect on the circuit. There is a resistance $R_{DC}$ between the central portion of the lower cladding layer which connects the waveguides 212, 213 and the DC voltage source 244, which provides a path to ground. Other alternative paths to ground may also exist within the circuit, with various different resistances.

At high frequency, the reactance of the waveguides 212, 213 is much less than the resistance to ground via the DC voltage source. As such, the leakage of the RF signal to ground via the DC voltage source is not significant, as the resistance $R_{DC}$ has only negligible effect on the total impedance between the central portion of the lower cladding layer and ground. However, at lower frequencies, the reactance of the waveguides will increase, and the total impedance between the central portion of the lower cladding layer and ground will be substantially lower in magnitude than the impedance between the signal electrode and the lower cladding layer, causing the voltage across the two waveguides to be different.

A modified waveguide structure is described below which causes the voltage across each waveguide to be balanced at much lower frequencies than in prior art structures.

Figure 4:
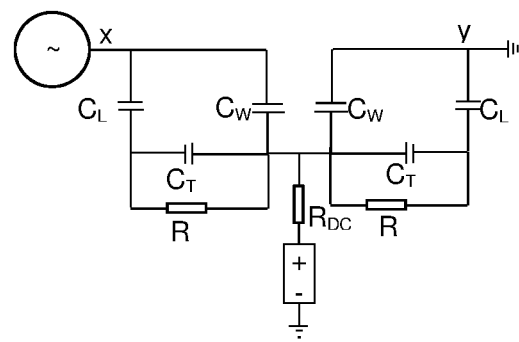
FIG. 4 is a circuit diagram of the equivalent circuit for an exemplary interferometer.

The equivalent circuit for the waveguide structure is shown in FIG. 4. Respective resistive structures having resistance R are used to connect the central portion of the lower cladding layer of the waveguides to the respective portion of the lower cladding layer which underlies each of the lines 211, 214. This effectively bypasses the capacitance $C_T$. The lines are considerably larger in area than the waveguides, and so the capacitance $C_L$ is much greater than the capacitance $C_W$. This means that the resistance R and capacitance $C_L$ provide a lower impedance path at lower frequencies than is provided by the capacitance $C_W$, and so the potential divider can remain substantially balanced at lower frequencies.

The lower the resistance R, the lower the frequency at which the circuit remains balanced. However, if the resistance R is too low, then a short circuit will form between the signal line electrode and ground line electrode via the signal line, the resistances R, and the ground line, effectively excluding the waveguides from the circuit. Therefore, the resistance R must be chosen to balance these effects. With reference to FIG. 4, the value of R reduces the impedance between the points labelled x and y which correspond to the signal line electrode and ground line electrodes. This impedance should typically be a factor of 10 lower than the resistance Rdc between the central portion of the lower cladding layer of the waveguides and the DC bias source. Depending on the value of Rdc typical values may be above 10 Ohms, above 100 Ohms, above 1 kilo Ohm, etc. but typically below 100 kilo Ohm, below 10 kilo Ohms, etc.

Figure 5A:
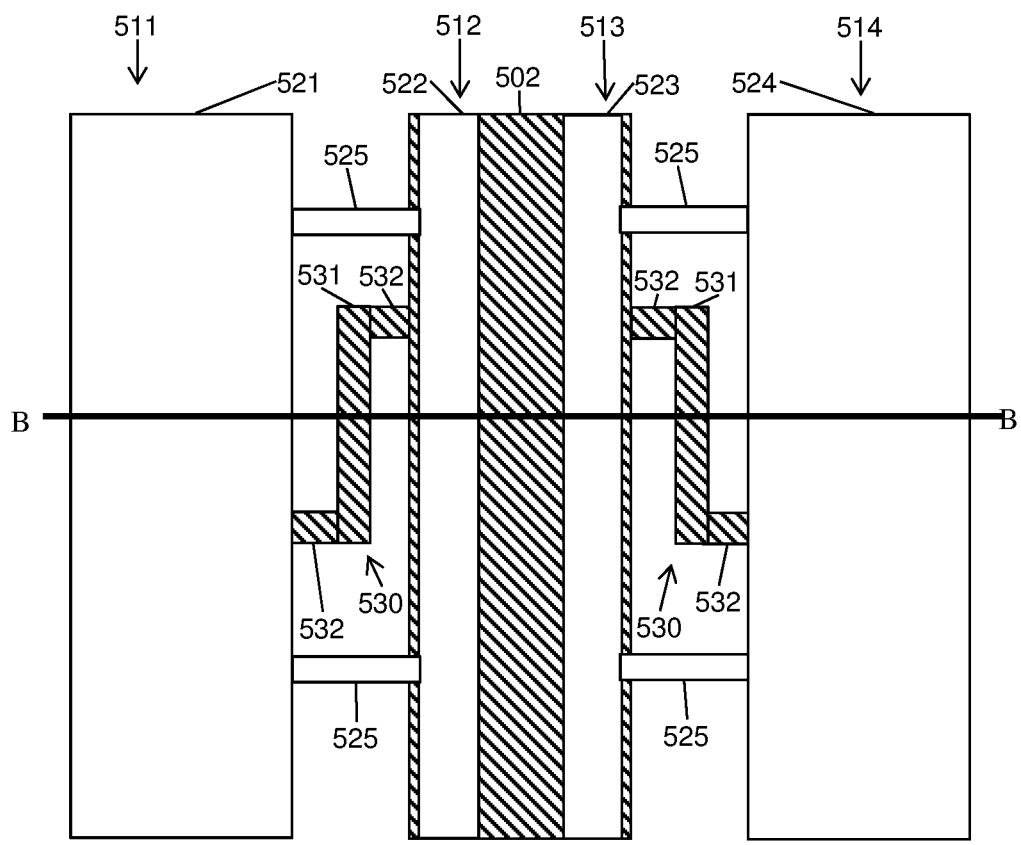
FIG. 5A is a plan view and FIG. 5B is a cross section of an exemplary interferometer.
Figure 5B:
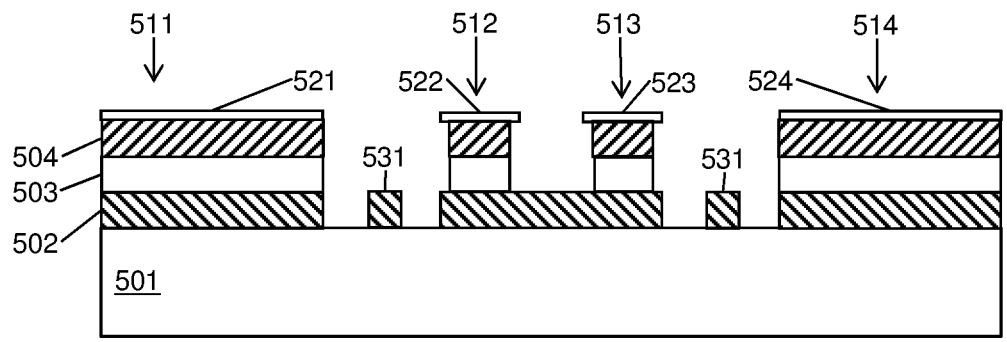

FIG. 5A shows a plan view of a part of an exemplary waveguide structure, and FIG. 5B is a cross section along the line B-B. The waveguide structure comprises an insulating or semi-insulating substrate 501, which may be made from a semiconductor such as InP or GaAs doped to have semi-insulating properties (e.g. a resistivity greater than $10^5$ Ohm cm). On top of the substrate 501 are several semiconductor layers, comprising in order a lower cladding layer 502, a waveguide core layer 503, and a upper cladding layer 504. The upper and lower cladding layers 502, 504 comprise doped semiconductor, e.g. the upper cladding layer may be a p-doped semiconductor layer and the lower cladding layer may be an n-doped semiconductor layer, or vice versa, or any other combination which can form a waveguide structure. These layers 502, 503, 504 are selectively etched to form a signal line 511, a signal waveguide 512, a ground waveguide 513, and a ground line 514. The waveguides 512, 513 are connected via a central portion of the lower cladding layer. Each of the waveguides 512, 513 and lines 511, 514 has a corresponding electrode 521, 522, 523, 524, and the electrodes 521, 524 of each line 511, 514 are connected to the respective waveguide electrode 533, 523 by conductive airbridges 525. The airbridges may be provided periodically in the length direction of the waveguides 512, 513. For simplicity only two such bridges are shown in FIG. 5A, but in other exemplary waveguide structures the number of bridges is higher than this.

The respective portion of the lower cladding layer 502 within each waveguide 512, 514 is connected to the respective portion of the lower cladding layer 502 within the respective line 511, 514 by a respective resistive structure 530. The resistive structures 530 are formed as portions of the lower cladding layer 502, comprising an elongate portion 531 which extends in the extension direction of the waveguides 512, 513. Each elongate portion 531 is connected at one end to portion of the lower cladding layer within the respective line 511, 514, and at the other end to the portion of the lower cladding layer 502 within the respective the waveguide 512, 513, by connecting portions 532. The length and width of the resistive structure 503 is chosen to provide an appropriate resistance R.

Other arrangements of resistive structures providing an appropriate resistance R may also be used. However, as in the example above, the resistive structures are in the plane of the lower cladding layer. The resistive structures may be portions of the lower cladding layer 502 (as in the example above) or separate bodies (e.g. formed during different processing steps).

The number and placement of the resistive structures 530 can be varied. For example, there may be a resistive structure at each end of the interferometer, or there may be multiple resistive structures along the length of the interferometer. As a further example, one resistive structure may be provided for each airbridge in the electrodes.

This has the advantage that the waveguide structure can then be designed as a regular repeating pattern, making manufacturing easier.

Figure 6:
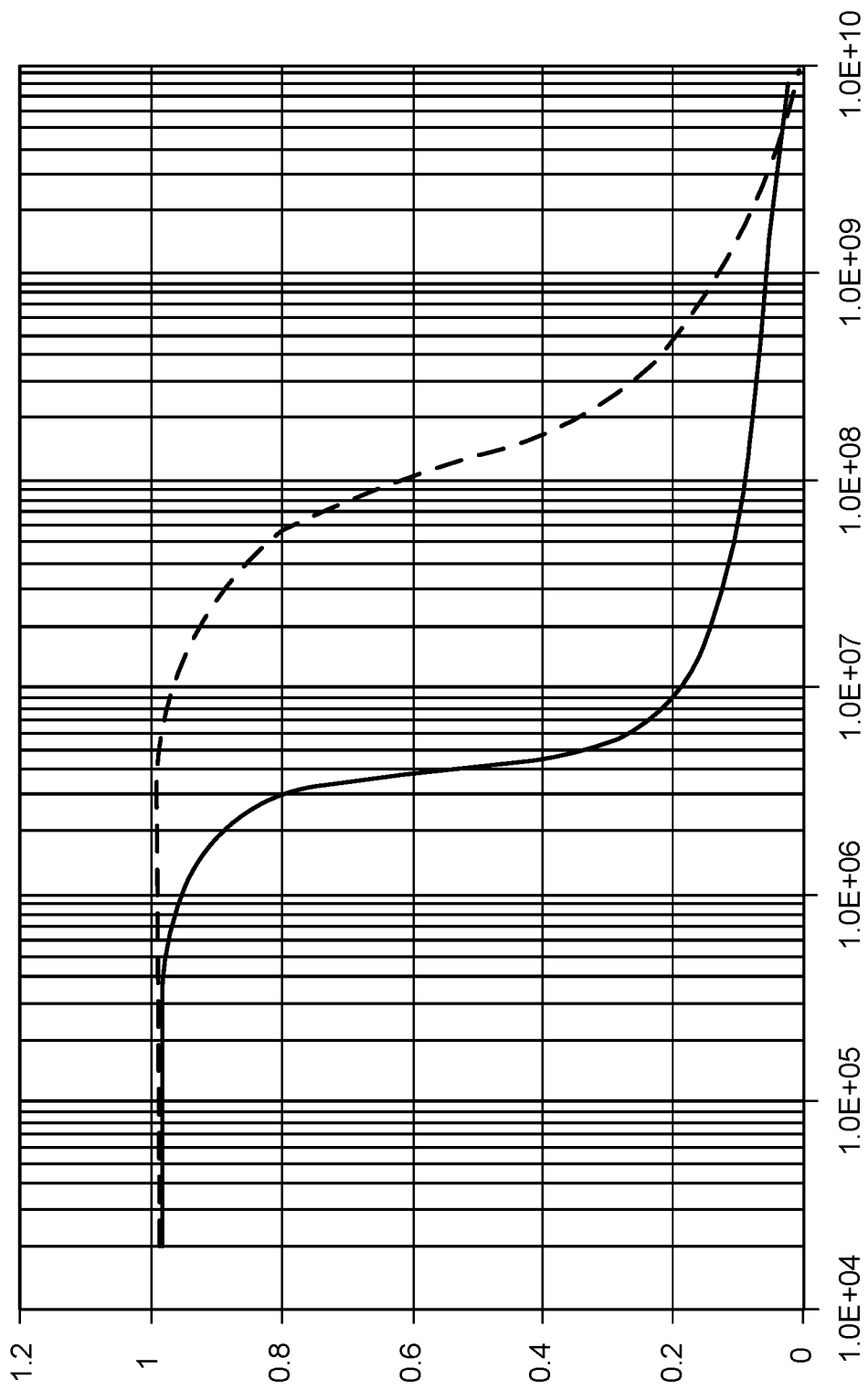
FIG. 6 is a graph of chirp parameter against frequency for a prior art interferometer and an exemplary interferometer.

FIG. 6 shows the effect of frequency (x-axis) on chirp parameter (y axis, higher values mean greater chirp, which is undesirable) for a prior art interferometer (the chirp parameter is indicated by the line 61) and an interferometer according to the construction of FIGS. 5A and 5B (the chirp parameter is indicated by the line 62). As can be seen from the FIG. 6, the interferometer of FIGS. 5A and 5B maintains low chip at frequencies several orders of magnitude below the frequencies at which the chirp of the prior art interferometer becomes excessive.

The waveguide structure may comprise a dielectric on the sides of the signal and ground waveguides, between the upper cladding layer and electrodes of the signal and ground line, filling the region between each line and each waveguide and/or filling the region between the waveguides.

The waveguide structure may be manufactured by providing a layered structure comprising an insulating or semi insulating substrate, lower cladding layer, waveguide core layer, and upper cladding layer, etching the layers to form the structure described above, and applying the electrodes to the lines and waveguides formed by the etching.

The invention claimed is:

1. A waveguide structure comprising:
a plurality of layers, the layers comprising, in order:
an insulating or semi-insulating substrate;
a lower cladding layer;
a waveguide core layer; and
an upper cladding layer;
wherein the lower cladding layer, the waveguide core layer, and the upper cladding layer are etched to form:
a signal waveguide and a ground waveguide that are connected via the lower cladding layer; and
a signal line and a ground line that are:
located adjacent to a respective waveguide, and
connected to a respective waveguide via one or more respective resistive structures connected in a plane of the lower cladding layer.

2. The waveguide structure according to claim 1, wherein
each of the signal waveguide, the ground waveguide, the signal line, and the ground line includes an electrode, and
wherein the electrode of the signal line and the electrode of the signal waveguide are electrically connected to each other and the electrode of the ground line and the electrode of the ground waveguide are electrically connected to each other.

3. The waveguide structure according to claim 1, wherein a resistance of each of the one or more respective resistive structures is between 10 Ohms and 10 kilo Ohms.

4. The waveguide structure according to claim 1, wherein the one or more respective resistive structures are portions of the lower cladding layer.

5. The waveguide structure according claim 4, wherein the one or more respective resistive structures each comprise an elongate portion of the lower cladding layer that is connected at one end to a corresponding waveguide and at another end to a corresponding line by respective connecting portions of the lower cladding layer.

6. The waveguide structure according to claim 1, wherein an electrode connected to the signal line and an electrode connected to the ground line are connected to a respective waveguide electrode via a plurality of conductive elements.

7. The waveguide structure according to claim 6, wherein a resistive structure is associated with each conductive element of the plurality of conductive elements.

8. A balanced push-pull Mach-Zehnder interferometer comprising:
a waveguide structure comprising:
a plurality of layers, the layers comprising, in order:
an insulating or semi-insulating substrate;
a lower cladding layer;
a waveguide core layer; and
an upper cladding layer;
wherein the lower cladding layer, the waveguide core layer, and the upper cladding layer are etched to form:
a signal waveguide and a ground waveguide that are connected via the lower cladding layer; and
a signal line and a ground line that are:
located adjacent to a respective waveguide, and
connected to a respective waveguide via one or more respective resistive structures connected in a plane of the lower cladding layer.

9. The balanced push-pull Mach-Zehnder interferometer according to claim 8, wherein
each of the signal waveguide, the ground waveguide, the signal line, and the ground line includes an electrode, and
wherein the electrode of the signal line and the electrode of the signal waveguide are electrically connected to each other and the electrode of the ground line and the electrode of the ground waveguide are electrically connected to each other.

10. The balanced push-pull Mach-Zehnder interferometer according to claim 8, wherein a resistance of each of the one or more respective resistive structures is between 10 Ohms and 10 kilo Ohms.

11. The balanced push-pull Mach-Zehnder interferometer according to claim 8, wherein the one or more respective resistive structures are portions of the lower cladding layer.

12. The balanced push-pull Mach-Zehnder interferometer according claim 11, wherein the one or more respective resistive structures each comprise an elongate portion of the lower cladding layer that is connected at one end to a corresponding waveguide and at another end to a corresponding line by respective connecting portions of the lower cladding layer.

13. The balanced push-pull Mach-Zehnder interferometer according to claim 8, wherein an electrode connected to the signal line and an electrode connected to the ground line are connected to a respective waveguide electrode via a plurality of conductive elements.

14. The balanced push-pull Mach-Zehnder interferometer according to claim 13, wherein a resistive structure is associated with each conductive element of the plurality of conductive elements.

15. A method of manufacturing a waveguide structure, the method comprising:
providing a layered structure comprising:
an insulating or semi-insulating substrate;
a lower cladding layer;

a waveguide core layer; and
a upper cladding layer; and
etching the lower cladding layer, the waveguide core layer, and the upper cladding layer to form:
a signal waveguide and a ground waveguide that are connected via the lower cladding layer; and
a signal line and a ground line that are:
located adjacent to a respective waveguide, and
connected to a respective waveguide via one or more respective resistive structures in a plane of the lower cladding layer.

16. The method according to claim 15, further comprising:
depositing an electrode on each of the signal waveguide, the ground waveguide, the signal line, and the ground line,
wherein the electrode of the signal line and the electrode of the signal waveguide are electrically connected to each other and the electrode of the ground line and the electrode of the ground waveguide are electrically connected to each other.

17. The method according to claim 15, wherein a resistance of each of the one or more respective resistive structures is between 10 Ohms and 10 kilo Ohms.

18. The method according to claim 15, wherein the one or more respective resistive structures are portions of the lower cladding layer.

19. The method according to claim 18, wherein the one or more respective resistive structures each comprise an elongate portion of the lower cladding layer that is connected at one end to a corresponding waveguide and at another end to a corresponding line by respective connecting portions of the lower cladding layer.

20. The method according to claim 15, wherein
an electrode connected to the signal line and an electrode connected to the ground line are connected to a respective waveguide electrode via a plurality of conductive elements, and
a resistive structure is associated with each conductive element of the plurality of conductive elements.

* * * * *